(12) United States Patent
Fenton et al.

(10) Patent No.: US 11,072,369 B2
(45) Date of Patent: *Jul. 27, 2021

(54) STAMPED REAR FRAME BOLSTER

(71) Applicant: STI Holdings, Inc., Stoughton, WI (US)

(72) Inventors: Gary L. Fenton, Edgerton, WI (US); Jason Alan Drost, Lake Mills, WI (US)

(73) Assignee: STI Holdings, Inc., Stoughton, WI (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/532,807

(22) Filed: Aug. 6, 2019

(65) Prior Publication Data

US 2020/0047809 A1 Feb. 13, 2020

Related U.S. Application Data

(60) Provisional application No. 62/715,648, filed on Aug. 7, 2018.

(51) Int. Cl.
*B62D 33/04* (2006.01)
*B62D 23/00* (2006.01)
*B62D 21/03* (2006.01)

(52) U.S. Cl.
CPC ............. *B62D 21/03* (2013.01); *B62D 23/00* (2013.01); *B62D 33/04* (2013.01)

(58) Field of Classification Search
CPC ....... B60R 19/56; B60R 19/18; B60R 19/182; B60R 19/1826; B60R 33/04; B60R 33/046

(Continued)

(56) References Cited

U.S. PATENT DOCUMENTS 4,211,444 A 7/1980 Glassmeyer
4,359,239 A 11/1982 Eggert, Jr.
(Continued)

FOREIGN PATENT DOCUMENTS

| CN | 100402177 C | * | 7/2008 | |
| CN | 202271938 U | * | 6/2012 | |
| WO | WO-03004316 A1 | * | 1/2003 | ............. B21D 53/88 |

OTHER PUBLICATIONS

Machine Language English Translaion of CN 2002271938 (Year: 2012).*

(Continued)

*Primary Examiner* — Jason S Morrow
*Assistant Examiner* — Kevin P Weldon
(74) *Attorney, Agent, or Firm* — Michael Best & Friedrich LLP

(57) ABSTRACT

A cargo transport rear frame includes a pair of posts, an upper cross member, and a rear bolster. The posts are spaced in a width direction, and extend in a height direction. The upper cross member extends along the width between the posts. The rear bolster extends between lower ends of the posts such that the rear bolster is spaced below the upper cross member. The posts, the upper cross member, and the rear bolster bound the rear cargo opening. The rear bolster has a first side facing in a forward direction, and the rear bolster has a second side facing in a rearward direction to be exposed to a rear side of the cargo transport rear frame. The rear bolster comprises a sheet metal stamping including a base surface and a relief embossed in the rearward direction from the base surface to form a loading dock engagement feature.

12 Claims, 6 Drawing Sheets

(58) Field of Classification Search
USPC .......................................... 296/182.1, 184, 1
See application file for complete search history.

(56) References Cited

U.S. PATENT DOCUMENTS

| | | | |
|---|---|---|---|
| 5,507,546 A | 4/1996 | Holley | |
| 5,632,518 A | 5/1997 | Kendall | |
| 5,673,953 A | 10/1997 | Spease | |
| D398,264 S | 9/1998 | Fetz et al. | |
| 6,360,441 B1 | 3/2002 | Himsl et al. | |
| D458,565 S | 6/2002 | Maher et al. | |
| 6,652,010 B1 * | 11/2003 | Huddle | B60R 19/56 293/102 |
| 7,025,396 B2 * | 4/2006 | Omura | B60R 19/18 293/102 |
| 7,703,820 B2 | 4/2010 | Perarnau Ramos et al. | |
| 8,096,595 B2 * | 1/2012 | Muskos | B60R 19/023 293/120 |
| 8,100,465 B2 | 1/2012 | Wylezinski | |
| D703,106 S | 4/2014 | Deighton | |
| 8,714,792 B2 | 5/2014 | Adams | |
| 9,527,465 B2 | 12/2016 | Johnson et al. | |
| 9,566,923 B2 | 2/2017 | Wylezinski et al. | |
| D790,407 S | 6/2017 | Miller et al. | |
| 9,771,040 B2 | 9/2017 | Miller et al. | |
| 9,783,144 B2 | 10/2017 | Miller et al. | |
| 9,908,453 B2 | 3/2018 | McKibben et al. | |
| 9,914,389 B2 | 3/2018 | Ehrlich et al. | |
| 10,179,559 B2 | 1/2019 | Ghannam et al. | |
| 10,272,859 B2 | 4/2019 | Miller et al. | |
| 10,369,949 B2 | 8/2019 | Miller | |
| D864,038 S | 10/2019 | Miller et al. | |
| 10,640,068 B2 | 5/2020 | Miller | |
| D889,320 S | 7/2020 | Miller et al. | |
| 2004/0061357 A1 | 4/2004 | Long et al. | |
| 2006/0131930 A1 | 6/2006 | Long et al. | |
| 2008/0073941 A1 | 3/2008 | Wylezinski | |
| 2017/0210211 A1 | 7/2017 | Clausen et al. | |
| 2018/0009401 A1 | 1/2018 | Miller et al. | |
| 2020/0047809 A1 | 2/2020 | Fenton et al. | |
| 2020/0172012 A1 | 6/2020 | Pincheon | |

OTHER PUBLICATIONS

Ontario Trucking Association, "US Bill Would Require Trailer Underride Guards, Bolster Rear Guards," <https://ontruck.org/us-bill-would-require-trailer-underride-guards-bolster-rear-guards/> wep page publicly available at least as early as Oct. 16, 2020.

"New Safety Measures for Preventing Underride Fatalities", Website, David Law Firm, San Antonia, TX, https://ieffdavislawfirm.com/truck-underride-accidents-safety/, (6 pages).

Stoughton Trailers, Rear Frame and Rear Cross Member Assembly, products in commerce and publicly available Dec. 2016, representative production drawings and statement of relevance attached (6 pages).

* cited by examiner

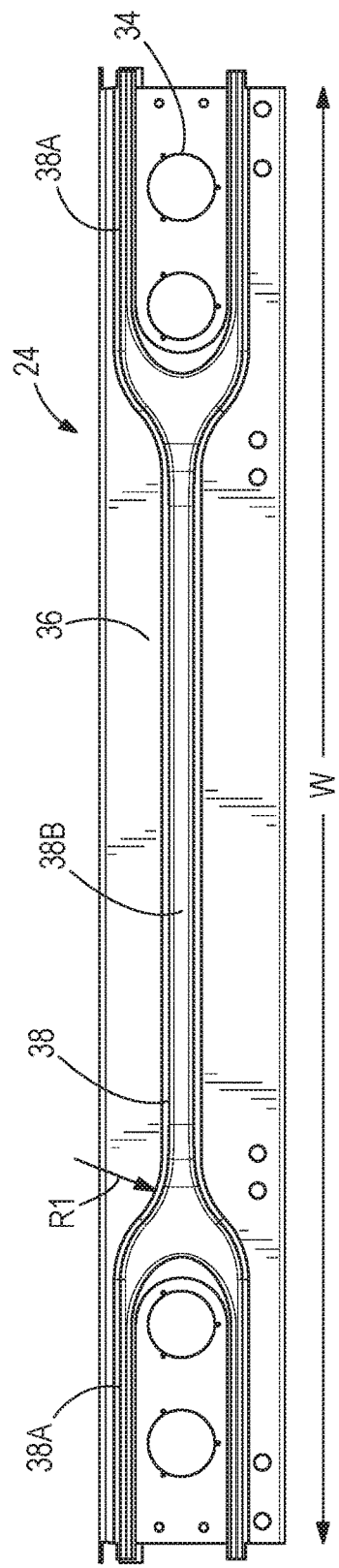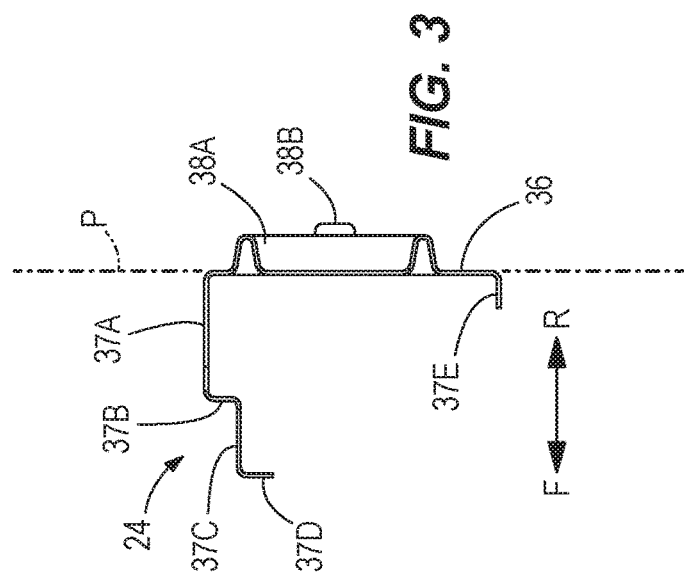

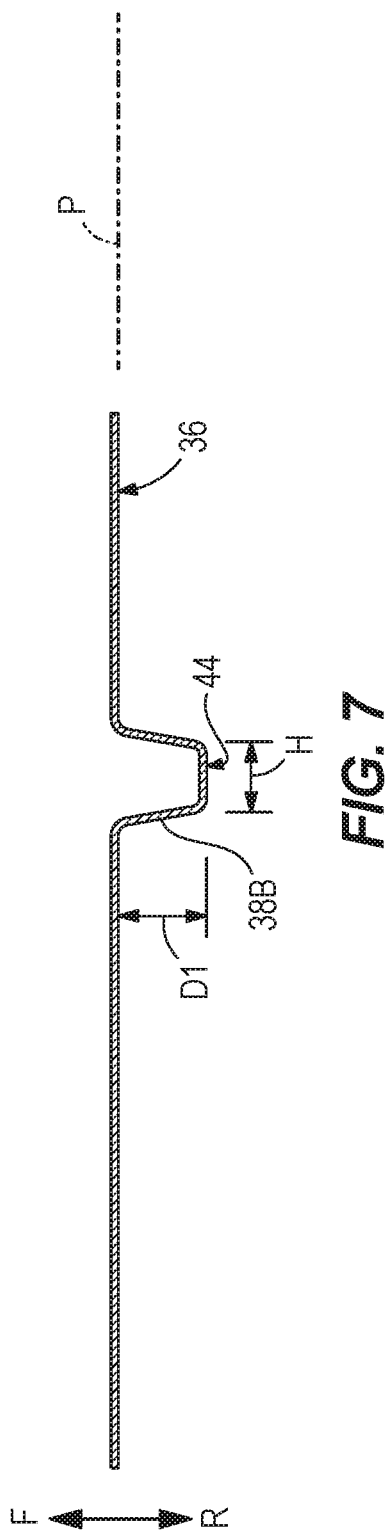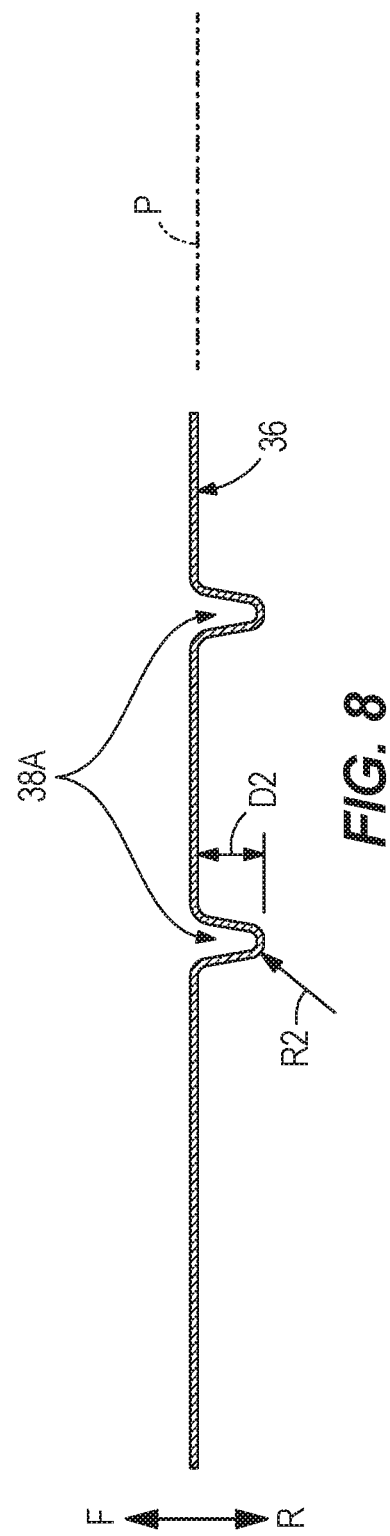

STAMPED REAR FRAME BOLSTER

CROSS-REFERENCE TO RELATED APPLICATIONS

This application claims priority to U.S. Provisional Patent Application No. 62/715,648, filed Aug. 7, 2018, the entire contents of which are incorporated by reference herein.

BACKGROUND

The disclosure relates to the construction of cargo transports, such as vehicles for over-the-road freight hauling. These may include enclosed and open trailers (e.g., semi-trailers), box trucks, and vans, for example. The disclosure further relates to rear frames thereof.

SUMMARY

In one aspect, the invention provides a cargo transport rear frame defining a rear cargo opening, the cargo transport rear frame including a pair of posts, an upper cross member, and a rear bolster. The posts are spaced apart in a width direction, each of the pair of posts extending in a height direction. The upper cross member extends along the width direction between respective upper ends of the pair of posts. The rear bolster extends along the width direction between respective lower ends of the pair of posts such that the rear bolster is spaced below the upper cross member in the height direction. The pair of posts, the upper cross member, and the rear bolster bound the rear cargo opening. The rear bolster has a first side facing in a forward direction that is perpendicular to both the width and height directions, and the rear bolster has a second side facing in a rearward direction to be exposed to a rear side of the cargo transport rear frame. The rear bolster comprises a sheet metal stamping including a base surface and a relief embossed in the rearward direction from the base surface to form a loading dock engagement feature.

In another aspect, the invention provides a rear bolster for a cargo transport rear frame. The rear bolster includes a base surface having lateral outboard ends spaced in a width direction and having a top edge and a bottom edge spaced in a height direction. A first side of the rear bolster faces in a forward direction that is perpendicular to both the width and height directions. A second side of the rear bolster faces in a rearward direction to be exposed to a rear side of the cargo transport rear frame having the rear bolster. A relief is embossed in the rearward direction from the base surface to form a loading dock engagement feature. The rear bolster, including the embossed relief, is a sheet metal stamping.

BRIEF DESCRIPTION OF THE DRAWINGS

FIG. 2 is an end view of the stamped rear bolster.

FIG. 3 is a rear view of the stamped rear bolster.

FIG. 7 is a cross-sectional view of the stamped rear bolster taken along line 7-7 of FIG. 5.

FIG. 8 is a cross-sectional view of the stamped rear bolster taken along line 8-8 of FIG. 5.

DETAILED DESCRIPTION

Figure 1:
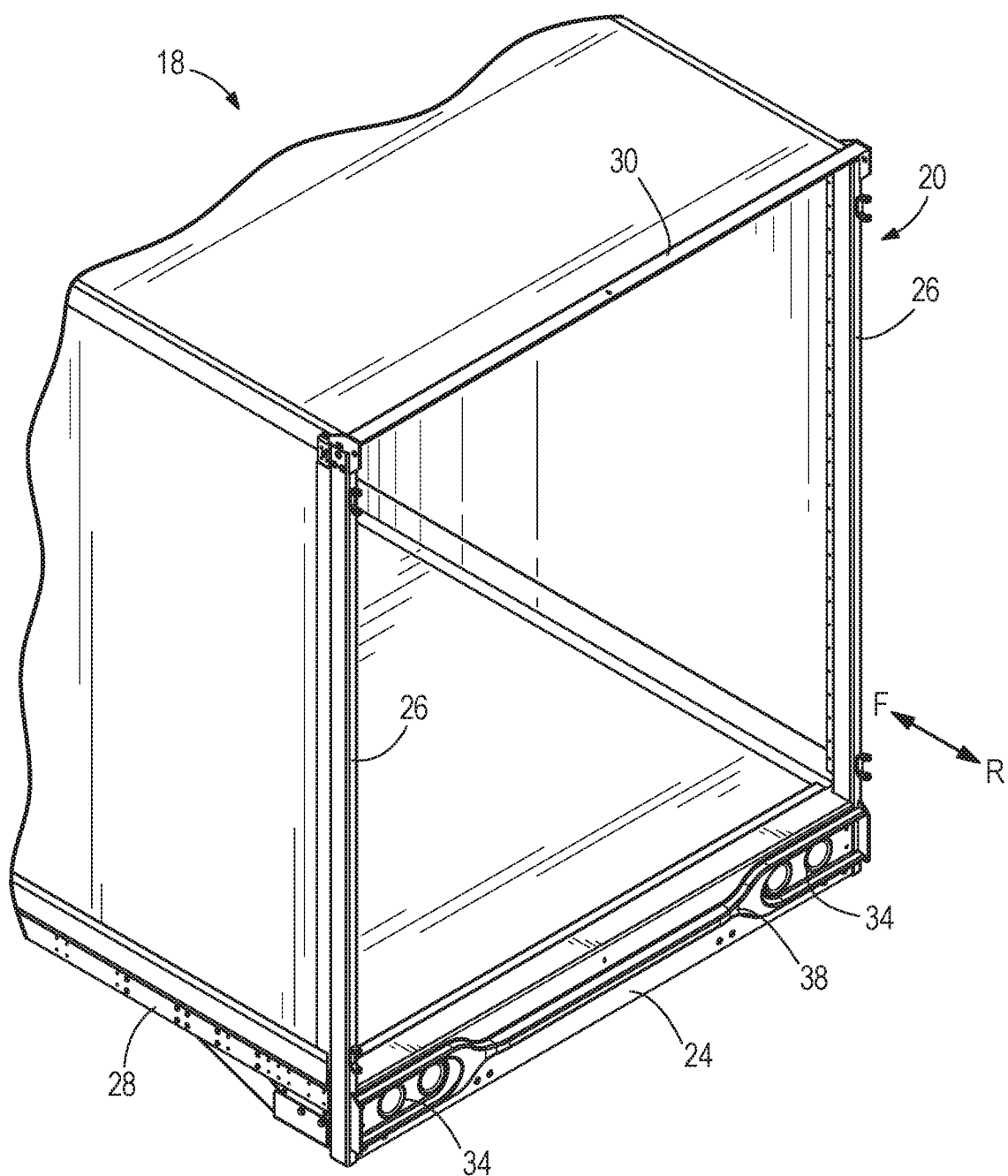
FIG. 1 is a perspective view of a rear portion of a cargo transport including a stamped rear bolster according to one embodiment of the present invention.
Figure 4:
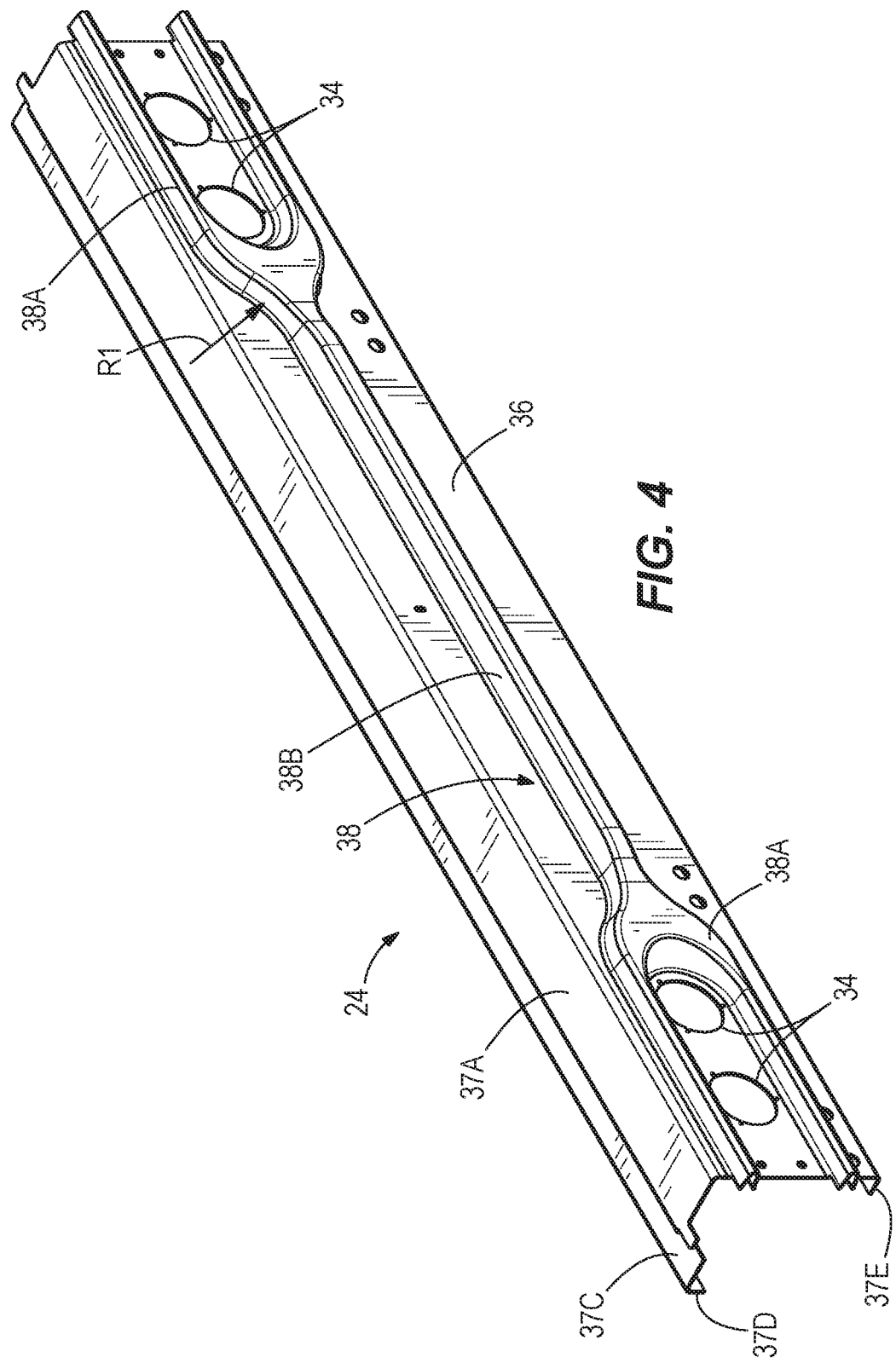
FIG. 4 is a perspective view of the stamped rear bolster.

FIG. 1 illustrates a rear portion of a cargo transport such as a trailer 18. For example, the cargo transport 18 can be a semi-trailer or other over-the-road cargo hauler (e.g., for attachment with a road tractor in forming a so-called 18-wheeler). The illustrated cargo transport 18 is an enclosed semi-trailer having a load floor for receiving and supporting cargo for transport, front, left side, and right side walls extending upward from the load floor, a roof extending over the load floor, and a rear opening selectively closeable by one or more doors (not shown). The cargo transport 18 can have a length of 53 feet, although the cargo transport 18 can have a length greater than or less than 53 feet in other constructions. Aspects of the invention may not be limited to enclosed semi-trailers as illustrated, and it will be understood that features described herein may also apply to many other types of cargo transports. The cargo transport 18 has a rear frame 20 including a rear bolster 24, a pair of vertical posts 26, and an upper cross member 30. The vertical posts 26 are laterally spaced to define a width W of the rear frame 20. The rear bolster 24 spans between the vertical posts 26 at their lower ends. The upper cross member 30 spans between the vertical posts 26 at their upper ends, generally parallel to and above the rear bolster 24. A rear cargo opening into the cargo volume of the cargo transport 18 is defined by the rear frame 20. The door(s) can be supported on the rear frame 20. The rear bolster 24 can be positioned at the bottom rear edge of the cargo area and a bottom rear edge of the rear frame 20. The character F indicates the forward direction, and the character R indicates the rearward direction. Longitudinal bottom rails 28 extend forwardly from the rear bolster 24 along the length of the cargo transport 18. The vertical posts 26 can have a hollow box structure, or other suitable construction. Opposing lateral distal ends of the rear bolster 24 are secured to (e.g., welded to) the vertical posts 26, for example at the bottom ends of the respective vertical posts 26.

Figure 5:
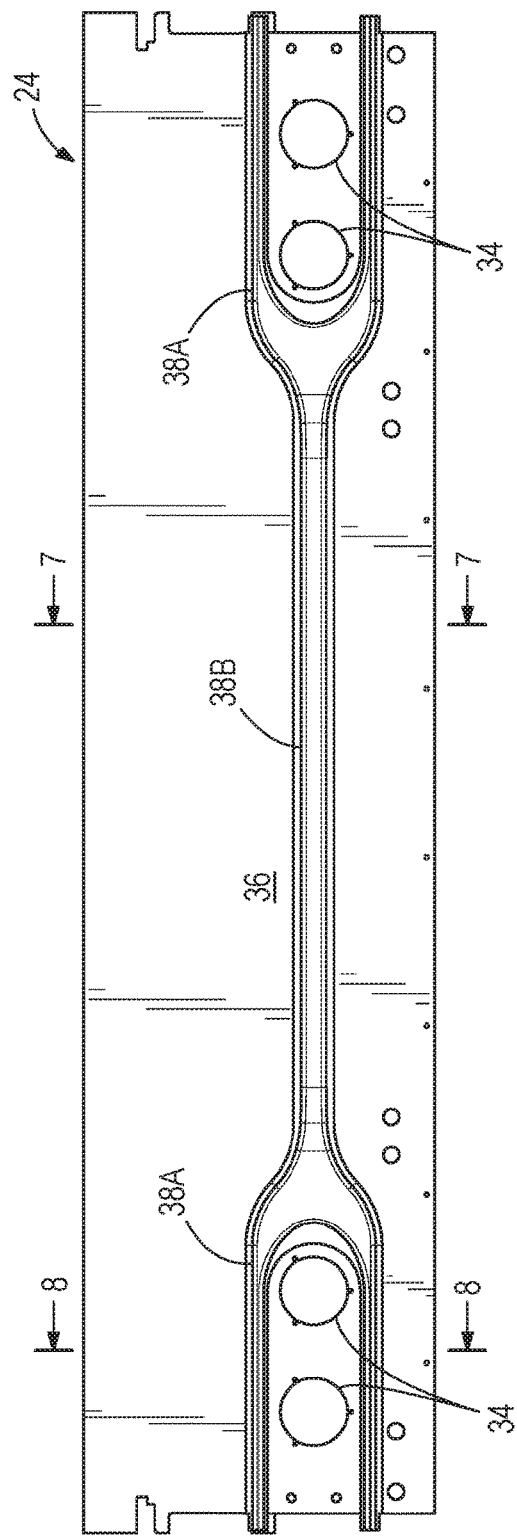
FIG. 5 is a front view of the stamped rear bolster prior to final forming.
Figure 6:
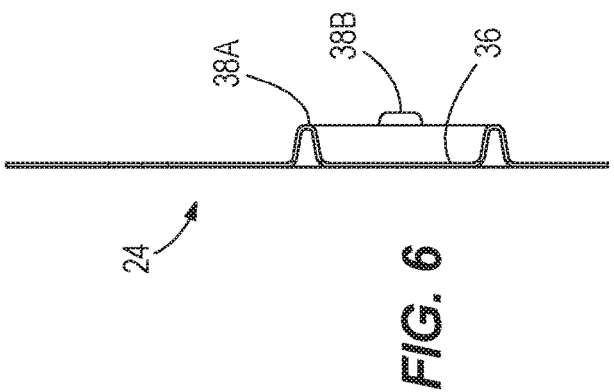
FIG. 6 is an end view of the stamped rear bolster as shown in FIG. 5.

The rear bolster 24 can be constructed as a stamped article, "a stamping," and particularly a sheet metal stamping. The rear bolster 24 can be stamped into shape, e.g., the final shape as shown in FIGS. 1-4, from a single flat metal sheet. The metal sheet can be a monolithic metal sheet having a uniform material thickness throughout (e.g., between ⅛ inch and ¼ inch, such as 8-gauge, or ¹¹⁄₆₄ inch). Exemplary materials include stainless steel, aluminum, among others. At each of the outboard ends of the rear bolster 24, there are provided multiple taillight mounts 34, which are shown as a group of two apertures, though each group may be provided with different numbers, such as three. The taillight mounts 34 are provided in a rear-facing base surface 36 of the rear bolster 24 that lies predominantly in a vertical plane P (FIG. 2). The rear bolster 24 includes additional surfaces or panels 37A-37E bent forwardly from the rear-facing base surface 36. For example, in end view (FIG. 2) it can be seen that the upper side of the rear bolster 24 includes: a first horizontal panel 37A extending forwardly from a top of the base surface 36, a first vertical panel 37B extending downwardly from the first horizontal panel 37A, a second horizontal panel 37C extending forwardly from the first vertical panel 37B, and a second vertical panel 37D extending downwardly from the second horizontal panel 37C. As illustrated, the rear bolster 24 terminates at a bottom edge of the second vertical panel 37D. An additional horizontal panel 37E extends forwardly from a bottom of the base surface 36. FIGS. 5 and 6 illustrate the rear bolster 24 prior to final forming, in a state where the additional panels 37A-37E are not yet put into place. Rather the material to form the additional panels 37A-37E lies in-plane with the base surface 36.

Furthermore, a relief 38 is stamped, or in other words pressed or embossed, into the base surface 36 to protrude therefrom. The relief 38 is raised from the base surface 36 in the rearward direction R as shown, and may generally be referred to as a dock impact or engagement feature(s). The relief 38 includes a relief portion 38A at each outboard end at least partially surrounding (e.g., above and/or below) the respective taillight mounts 34 (and the requisite taillights, once mounted). Each outboard relief portion 38A has a horizontally-extending yoke or fork shape in which upper and lower linear portions join together at an inboard side of the taillight mounts 34. The outer profile of the fork shape in each outboard relief portion 38A where the linear portions come together can define a constant or variable radius R1 (i.e., four separate radiused portions in total). In some aspects, the radius R1 is between 5 and 7 inches. In addition, the two outboard relief portions 38A can be connected to each other by a relief portion 38B in the form of a horizontally-extending channel, bar, or beam. Thus, as illustrated, the various relief portions 38A, 38B are formed as an integral stamped relief 38 in the rear bolster 24. However, the cross-sections of the various relief portions 38A, 38B are not necessarily uniform.

As shown in the end view of FIG. 2, the central relief portion 38B between the outboard relief portions 38A extends further rearward from the plane P defined by the base surface 36. Particularly, and with further reference to the cross-sections of FIGS. 7 and 8, the central relief portion 38B defines a first fore-aft depth D1 from the plane P and the outboard relief portions 38A define a second lesser fore-aft depth D2 from the plane P. As such, the central relief portion 38B between the outboard relief portions 38A may exclusively make contact with a loading dock structure of a building, or may limit the amount of contact between the loading dock structure and the outboard relief portions 38A. This can protect the outboard relief portions 38A from damage, particularly when a trailer's front end is hoisted up and/or let down while the rear bolster 24 is pressed into contact with the loading dock structure. The central relief portion 38B may extend further rearward than the outboard relief portions 38A by at least 0.40 inch (10 mm), and in some constructions at least 0.80 inch (20 mm) (e.g., less than 2 inches, in other words up to but not exceeding 50 mm). The outboard relief portions 38A may be raised from the base surface 36 such that the depth D2 is 1.0 inch (25 mm) or more (e.g., 1.4 to 1.6 inches (35 to 41 mm)). The central relief portion 38B may be raised from the base surface 36 such that the depth D1 is at least 1.6 inches (40 mm) (e.g., 1.6 to 2.4 inches (40 to 61 mm)).

As shown in FIG. 7, the central relief portion 38B can have a flat land surface 44. The flat land surface of the central relief portion 38B can be a vertically oriented surface having a height H of 0.80 inch (20 mm) or more. In cross-section, the central relief portion 38B can be generally trapezoidal. For example, wall sections extending (e.g., extending straight) from the base surface 36 to the flat land surface 44 can be tapered to reduce in height toward the flat land surface 44. On the other hand, the outboard relief portions 38A can have a radius of curvature R2, without flat lands, at their rearward extents. The radius R2, which can be constant or variable, is between 0.2 and 0.5 inches (5 to 13 mm) in some constructions. The radius R2 can assist in easing sliding along a surface of a loading dock structure.

By stamping the relief 38 into the rear bolster 24, substantial welding labor is avoided. The relief 38, and other portions of the rear bolster 24, can be designed for handling the loading requirements of the rear frame 20, such as rear and side impact load requirements, fork lift drive-over loading, without weld-on reinforcements. Stress concentrations can be avoided by rounded corners and transitions. For example, each outboard relief 38A has the general shape of a horseshoe, open toward the outboard end, and having a rounded, closed end opposite thereof. As such, the relief 38 as a whole has a double-forked shaped, spanning the width W of the rear bolster 24. As described above, a fork shape is formed at each location where the upper and lower parts of one of the outboard relief portion 38A merge into the central relief portion 38B.

Figure 9:
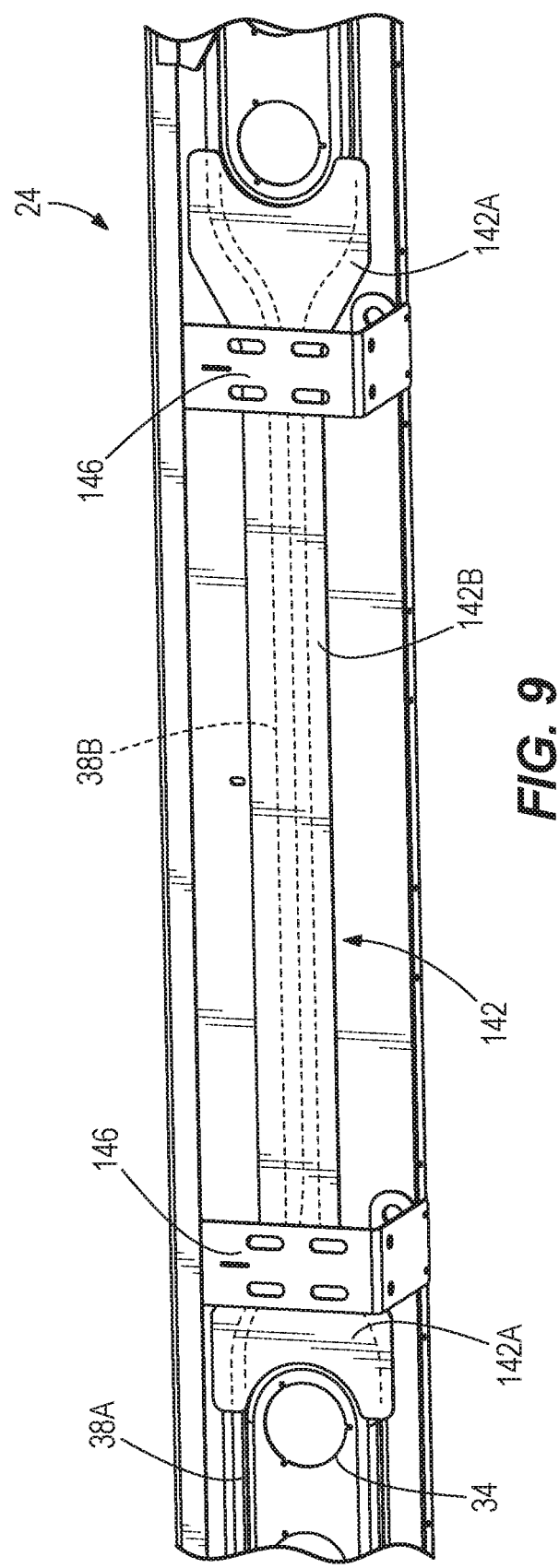
FIG. 9 is a perspective view of a front side of the stamped rear bolster having an optional backing plate.

In some constructions, an additional backing plate 142 (FIG. 9) is provided on the forward side of the rear bolster 24. The backing plate 142 can have a flat sheet or plate construction. The backing plate 142 can lie directly behind the central relief portion 38B when viewed from the rear side. The backing plate 142 can cover all or a portion of the central relief portion 38B. In addition, the backing plate 142 may cover at least a portion of each of the outboard relief portions 38A. As shown in FIG. 9, the outboard ends 142A of the backing plate 142 can be fork-shaped and can be wider in the vertical direction than the central portion 142B. The ends 142A can terminate at the respective taillight mounts 34. Additional gusseting may also be provided to reinforce the stamped rear bolster 24. For example, one or more gussets 146 are provided to span between the panels 37D and 37E of the rear bolster 24. The gusset(s) 146 and/or the backing plate 142 may be attached to the rear bolster stamping by welding at one or more individual locations. Although shown together, the gusset(s) 146 and the backing plate 142 may be used separately without the other in other constructions. Even if the backing plate 142 and/or gusset(s) 146 are utilized, so that the rear bolster is assembled from more than a single unitary, monolithic sheet, there are no reinforcing structures added to the rear bolster stamping on the rear-facing side (e.g., on the base surface 36).

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, one having ordinary skill in the art will appreciate that specific features of the numerous embodiments disclosed may be mixed and matched in other ways where not specifically inhibited, even though specific illustration of such embodiments may not be exhaustively covered herein.

What is claimed is:

1. A cargo transport rear frame defining a rear cargo opening, the cargo transport rear frame comprising:
   a pair of posts spaced apart in a width direction, each of the pair of posts extending in a height direction;
   an upper cross member extending along the width direction between respective upper ends of the pair of posts; and
   a rear bolster extending along the width direction between respective lower ends of the pair of posts such that the rear bolster is spaced below the upper cross member in the height direction, wherein the pair of posts, the upper cross member, and the rear bolster bound the rear cargo opening, wherein the rear bolster has a first side facing in a forward direction that is perpendicular to both the width and height directions, and the rear bolster has a second side facing in a rearward direction to be exposed to a rear side of the cargo transport rear frame, wherein the rear bolster comprises a sheet metal stamping including a base surface and a relief embossed in the rearward direction from the base surface to form a loading dock engagement feature configured to withstand repeated loading dock impacts, wherein the rear bolster further includes at least one additional panel bent in the forward direction from a top edge or a bottom edge of the base surface, wherein the sheet metal stamping is from a monolithic metal sheet of a uniform thickness, wherein the rear bolster includes a pair of widthwise-spaced outboard ends, each of the outboard ends including a taillight mount, and wherein the embossed relief includes a taillight surround portion extending at least partially around the taillight mount at each of the outboard ends, wherein the embossed relief further includes an additional central connecting portion extending directly from inboard ends of both of the taillight surround portions, wherein the central connecting portion of the embossed relief is extended farther in the rearward direction than the taillight surround portions.

2. The cargo transport rear frame of claim 1, wherein the base surface defines a plane extending in the width and height directions.

3. The cargo transport rear frame of claim 1, wherein the central connecting portion of the embossed relief is extended farther in the rearward direction than the taillight surround portions by at least 10 mm and not more than 50 mm.

4. The cargo transport rear frame of claim 3, wherein the central connecting portion of the embossed relief is extended farther in the rearward direction than the taillight surround portions by at least 20 mm.

5. The cargo transport rear frame of claim 1, wherein in each of the taillight surround portions, the embossed relief has a curved rear end profile in cross-section taken perpendicular to the width direction.

6. The cargo transport rear frame of claim 1, wherein the rear bolster further comprises a backing plate formed separately from the sheet metal stamping having the embossed relief, the backing plate providing a reinforcement along the first side that covers at least a portion of the embossed relief.

7. A rear bolster for a cargo transport rear frame, the rear bolster comprising:
a base surface having lateral outboard ends spaced in a width direction and having a top edge and a bottom edge spaced in a height direction;
a first side facing in a forward direction that is perpendicular to both the width and height directions;
a second side facing in a rearward direction to be exposed to a rear side of the cargo transport rear frame having the rear bolster;
an additional panel bent in the forward direction from the top edge or the bottom edge; and
a relief embossed in the rearward direction from the base surface to form a loading dock engagement feature configured to withstand repeated loading dock impacts,
wherein the rear bolster, including the embossed relief, is a sheet metal stamping from a monolithic metal sheet of a uniform thickness,
wherein each of the outboard ends includes a taillight mount, and wherein the embossed relief includes a taillight surround portion extending at least partially around the taillight mount at each of the outboard ends,
wherein the embossed relief further includes an additional central connecting portion extending directly from inboard ends of both of the taillight surround portions, and
wherein the central connecting portion of the embossed relief is extended farther in the rearward direction than the taillight surround portions.

8. The rear bolster of claim 7, wherein the base surface defines a plane extending in the width and height directions.

9. The rear bolster of claim 7, wherein the central connecting portion of the embossed relief is extended farther in the rearward direction than the taillight surround portions by at least 10 mm and not more than 50 mm.

10. The rear bolster of claim 9, wherein the central connecting portion of the embossed relief is extended farther in the rearward direction than the taillight surround portions by at least 20 mm.

11. The rear bolster of claim 7, wherein in each of the taillight surround portions, the embossed relief has a curved rear end profile in cross-section taken perpendicular to the width direction.

12. The rear bolster of claim 7, wherein the rear bolster further comprises a backing plate formed separately from the sheet metal stamping having the embossed relief, the backing plate providing a reinforcement along the first side that covers at least a portion of the embossed relief.

* * * * *